Jan. 30, 1923.

L. LA FRANCE.
BEARING FOR VEHICLE WHEELS.
FILED APR. 13, 1922.

1,443,417.

INVENTOR
L. LaFrance
BY J. Edward Mayber.
ATTY

Patented Jan. 30, 1923.

1,443,417

UNITED STATES PATENT OFFICE.

LEONARD LA FRANCE, OF TORONTO, ONTARIO, CANADA.

BEARING FOR VEHICLE WHEELS.

Application filed April 13, 1922. Serial No. 552,415.

*To all whom it may concern:*

Be it known that I, LEONARD LA FRANCE, of the city of Toronto, in the county of York, Province of Ontario, Canada, a subject of the King of Great Britain, have invented certain new and useful Improvements in Bearings for Vehicle Wheels, of which the following is a specification.

This invention relates to ball bearings particularly adapted for the metal hubbed wheels used for baby carriages and the like, and my object is to devise a simple, reliable and easily constructed and assembled bearing for that purpose.

I attain my object by means of the constructions hereinafter described and illustrated in the accompanying drawings in which—

Figure 1:
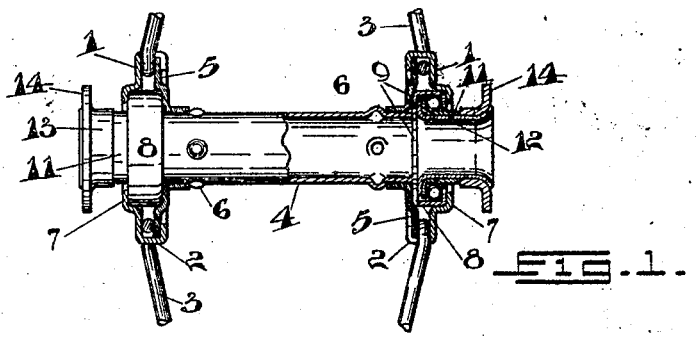
Figures 2, 3:
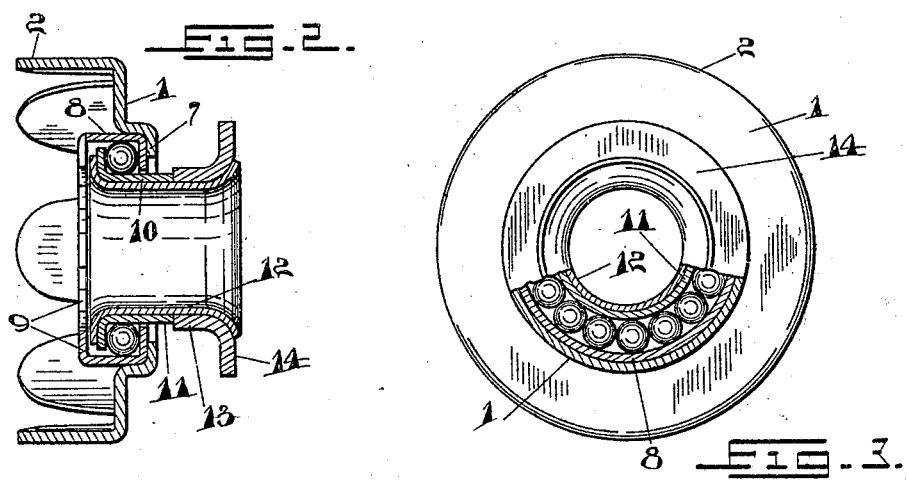

Fig. 1 is an elevation, partly in section, of a complete wheel hub provided with bearing constructed in accordance with my invention;

Fig. 2 an enlarged longitudinal section of one-half of the bearing;

Fig. 3 an end elevation of the same, partly in section; and

Figure 4:
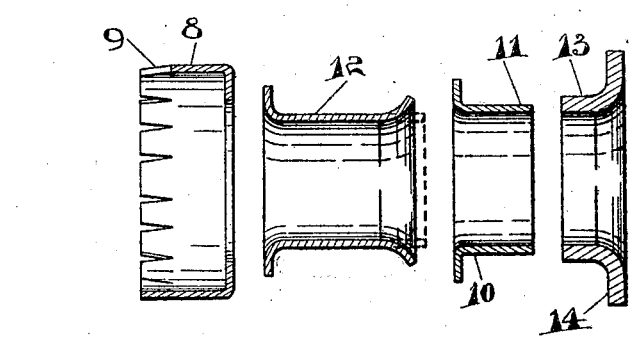

Fig. 4 a longitudinal section of the parts shown in Fig. 2 separated longitudinally.

In the drawings like numerals of reference indicate corresponding parts in the different figures.

1 is a hub disk, which has its rim 2 notched to receive the loops of the spokes 3 of the wheel. Two of these hub disks are employed, spaced apart by means of a sleeve 4, each end of which carries a disk 5. This disk 5 bears against the loops of the spokes 3, and the metal of the rim 2 between the notches therein is bent inwardly, as shown, so as to cause the disk 5 to securely clamp the spokes in position. The usual method of securing the disk in place on the sleeve 4 is to give the disk a driving fit on the sleeve, the disks being positioned by means of the projections 6 stamped in the periphery of the sleeve.

Each hub disk 1 has a central opening formed therein, the disk about said opening being outwardly offset to form an annular rabbet 7. In this annular rabbet fits an outer ball race 8. This is of ordinary form pressed from sheet steel, but has a split rim 9 formed thereon.

10 is an inner ball race of ordinary form and stamped from sheet steel. It is, however, formed with a tubular elongation 11 adapted to extend through the opening in the hub disk. This inner ball race is carried by a sleeve 12, also extending outwardly through the opening in the hub disk.

The inner end of the outer ball race is inwardly turned and the inner end of the sleeve 12 is outwardly turned to hold the inner ball race in place. The inner ball race is positioned against the inwardly turned end of the sleeve 12 by means engaging its tubular extension and the outer end of the sleeve.

The preferred construction of the retaining means comprises a cap formed with a collar 13 and an outwardly turned flange 14 integral therewith. The inner end of the collar bears against the tubular elongation 11 of the inner ball race and the outer end of the sleeve is spun or pressed outwardly to engage the outer side of the flange 14. The axle employed with the bearing will pass loosely through the sleeve 4, but will have a driving fit in the sleeve 5. The cap formed by the parts 13 and 14 has a function in retaining the axle in position in the hub, but, as this is old in the art, the construction is neither shown or described.

What I claim as my invention is:—

1. A ball bearing comprising a hub disk having a central opening therein, the disk about said opening being outwardly offset to form an annular rabbet; an outer ball race fitted in said rabbet; an inner ball race adapted to co-operate with the outer ball race fitted in said rabbet; an inner ball race is mounted, the inner end of the outer ball race being inwardly turned and the inner end of the sleeve outwardly turned to hold the inner ball race in place and means, engaging the outer end of the inner race and the sleeve, to hold the inner ball race against the outwardly turned end of the sleeve.

2. A ball bearing comprising a hub disk having a central opening therein, the disk about said opening being outwardly offset to form an annular rabbet; an outer ball race fitted in said rabbet; an inner ball race adapted to co-operate with the outer ball race; a sleeve on which the inner ball race is mounted, the inner end of the outer ball race being inwardly turned, and the inner end of the sleeve outwardly turned to hold the inner ball race in place; and a cap comprising an outwardly turned flange and a collar fitting over the outer end of the sleeve and engaging the outer end of the inner ball race, the outer end of the sleeve being outwardly turned to engage the outer side of the flange.

Signed at Toronto this 31st day of March, 1922, in the presence of the two undersigned witnesses.

LEONARD LA FRANCE.

Witnesses:
L. V. DUSSEAS,
R. DUCHAMBAUH.